July 3, 1956 — O. MITCHELL — 2,752,941
BALANCED PRESSURE REGULATOR
Filed May 14, 1951 — 3 Sheets-Sheet 1

INVENTOR:
ORVILLE MITCHELL,
By Kingsland, Rogers & Ezell
ATTORNEYS

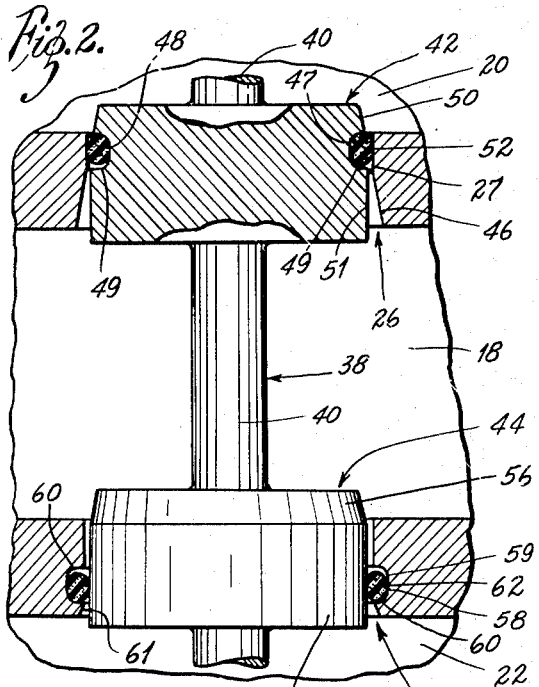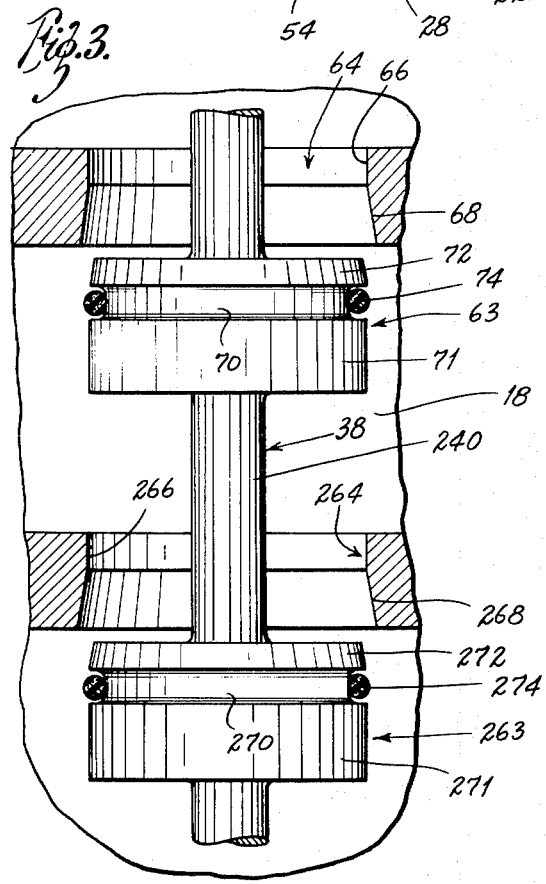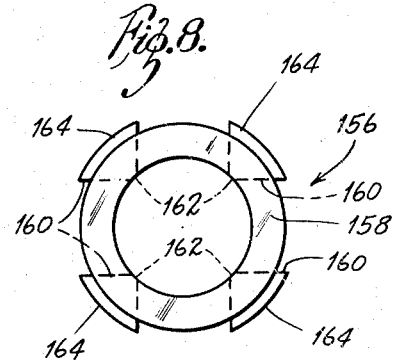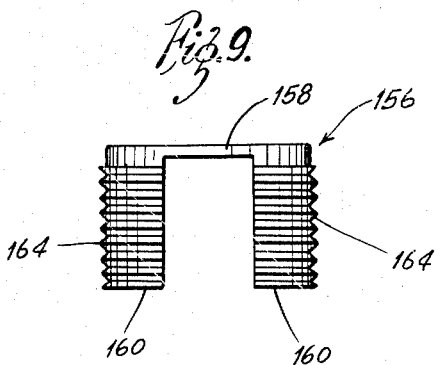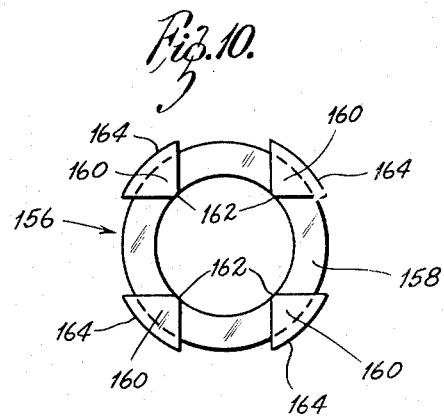

July 3, 1956

O. MITCHELL 2,752,941

BALANCED PRESSURE REGULATOR

Filed May 14, 1951

INVENTOR:
ORVILLE MITCHELL,
BY Kingsland, Rogers & Ezell

United States Patent Office 2,752,941
Patented July 3, 1956

2,752,941
BALANCED PRESSURE REGULATOR

Orville Mitchell, Dallas, Tex., assignor to John E. Mitchell Company, Dallas, Tex., a corporation of Missouri Application May 14, 1951, Serial No. 226,117

3 Claims. (Cl. 137—505.18)

The present invention relates to a novel balanced pressure regulator employing O-rings as the sealing means.

As is well known to those familiar with the valve art, a balanced type valve has a considerable advantage over a conventional single poppet type valve in that it is not affected by the pressures in the fluid it controls. In the case of pressure regulators, the balanced valve materially reduces the sizes of the motor means because the valve requires relatively little actuating force. One disadvantage of the conventional type balanced valve, however, is that a relatively close machining tolerance is required because of the necessity of having both valve elements seat at the same time. Or if slide valves are used, both the valves and the seats must be machined; and at best, friction is a problem.

It is an object of the present invention, therefore, to provide a novel balanced valve construction in which the tolerances can be relatively large without adversely affecting the successful operation of the valve. More particularly, it is an object to provide a novel valve construction in which the axial tolerances between the valve heads and the valve ports can be relatively quite large, and the lateral spacing between the peripheral edges of the valve heads and the inner surfaces of the valve ports can be about 1/32 of an inch without adversely affecting its operation. In one sense, it is an object to provide a balanced pressure regulator valve that has the simple character of poppet valves with the ease of assembly of a slide valve, and with better sealing than either.

Another object is to provide a novel pressure regulator having a balanced valve construction employing O-rings which will operate satisfactorily with relatively large pressure differentials. More particularly, it is an object to provide a balanced O-ring type pressure regulator in which the O-rings will not be displaced from their retaining grooves by the force caused by the difference in pressure between the inlet and the outlet sides of the valve.

Another object is to provide a novel O-ring groove forming means which is relatievly easy to machine and assemble, which provides for the ready removal of the O-rings and their associated structure for inspection or replacement. More particularly, it is an object to provide a novel balanced pressure regulator employing O-rings, which is relatively simple in construction both from the standpoint of the number and shape of the parts, and the number and type of machining operations required in forming the valve body, and which is relatively easy to assemble and disassemble for inspection and replacement of the valve stem assembly and the O-rings.

Further objects and advantages of the present invention will be apparent from the detailed description and the accompanying drawings wherein preferred embodiments of the present invention are shown.

In one form, the pressure regulator broadly comprises a valve assembly and a fluid pressure motor for controlling the movement thereof. The fluid pressure motor is of the diaphragm type, and is adapted to modulate the position of the valves relative to their valve seats to maintain a certain line pressure, and to close the valves against the seats under certain conditions. The valve assembly includes a valve housing having an inlet or high pressure chamber and an outlet or low pressure chamber, and a pair of opposed spaced valve ports between the chambers. A valve stem containing a pair of spaced valve heads is mounted for movement relative to the valve ports, the valve heads being spaced apart a distance substantially equal to the distance beetween the valve ports. An O-ring of resilient material is carried by either the valve head or the valve port of each group so that each O-ring will be disposed between the valve head and the wall of the valve port adjacent thereto when the valve stem is moved to the closed position. The valve stem is connected to the diaphragm of the diaphragm assembly, and the chamber adjacent the diaphragm is in communication with the outlet chamber whereby the movement of the valve stem is controlled primarily by the outlet pressure of the valve.

In the drawings:

Fig. 2 is an enlarged sectional view of the valve portion of the regulator shown in Fig. 1, the valve being shown in the fully closed position;

Fig. 3 is an enlarged view similar to Fig. 2, showing a modified valve head and port construction and showing the valve in the open position;

Fig. 8 is a top plan view of a combination valve guide and retainer used in the modified regulator construction;

Fig. 9 is a front elevational view of the combination valve guide and retainer; and Fig. 10 is a bottom plan view of the combination valve guide and retainer.

Figure 1:
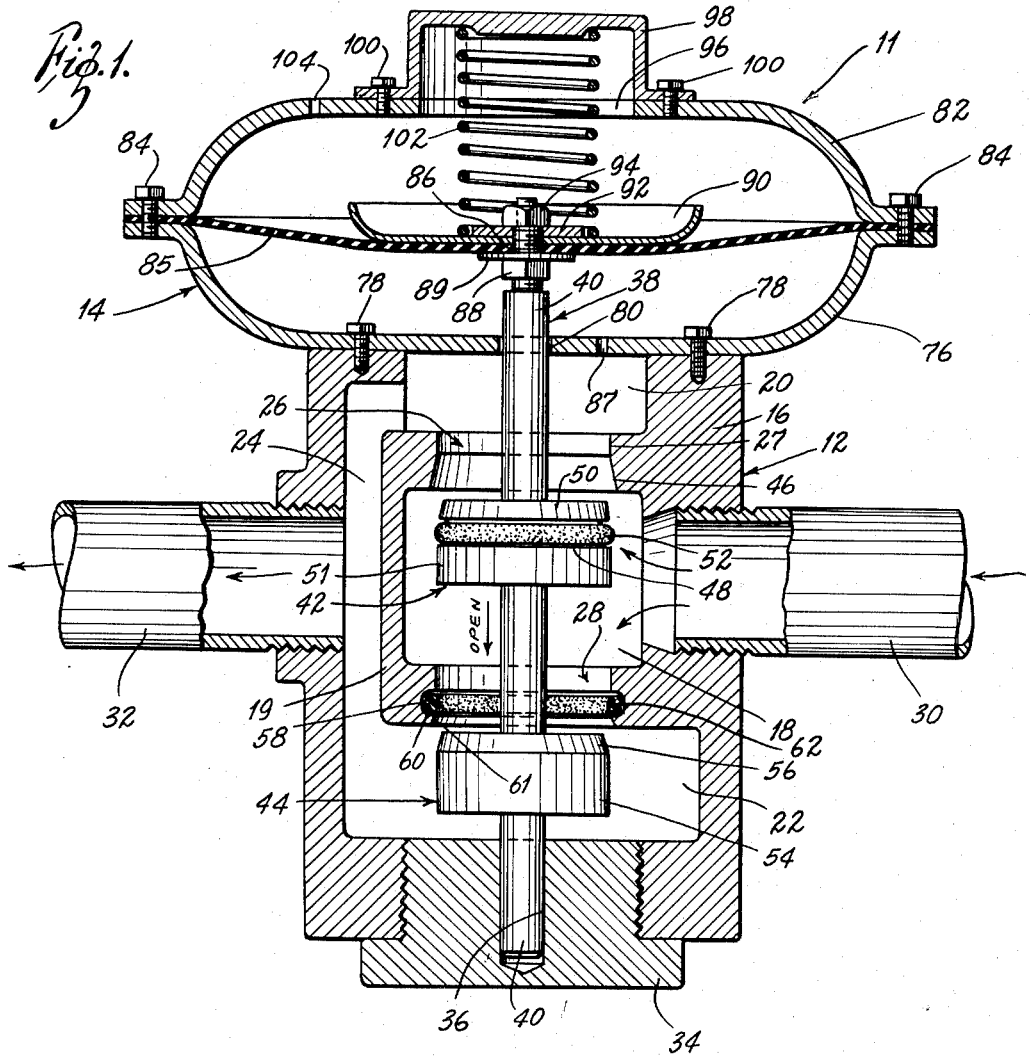
Fig. 1 is a vertical diametrical sectional view of a pressure regulator embodying the teachings of the present invention, the valve stem and O-rings being shown in elevation, with the valve in open position.

Referring to the drawings more particularly by reference numerals, 11 indicates generally a pressure regulator constructed in accordance with the teachings of the present invention, and which includes a valve assembly 12 and a diaphragm assembly 14.

The valve assembly 12 includes a valve body 16 which has an inlet or high pressure chamber 18 separated by a dual partition 19 from an open upper chamber 20, an open lower chamber 22, and an outlet chamber 24. As shown in Fig. 1, the upper chamber 20, the lower chamber 22, and the outlet chamber 24 are in communication. The partition 19 has opposed valve ports 26 and 28 between the inlet chamber 18 and the upper chamber 20, and between the inlet chamber 18 and the lower chamber 22, respectively.

An inlet conduit 30 is threadedly connected to the valve body 16 at the inlet chamber 18, and an outlet conduit 33 is threadedly connected at the outlet chamber 24.

The lower chamber 22 is closed by a threaded plug 34 which contains a cylindrical cavity 36 in the inner face thereof.

A valve stem assembly 38 is positioned within the valve housing 16 and includes an elongated valve stem 40, the lower end of which is slidably disposed in and guided by the cavity 36. The opening into the lower chamber 22 which is closed by the plug 34 is larger than the valve stem assembly 38 so that the latter can be inserted and withdrawn as a unit to facilitate assembly and repair.

Mounted on the valve stem 40 is an upper valve head 42 which cooperates with the upper valve port 26, and spaced therefrom is a lower valve head 44 which cooperates with the lower valve port 28.

Figure 4:
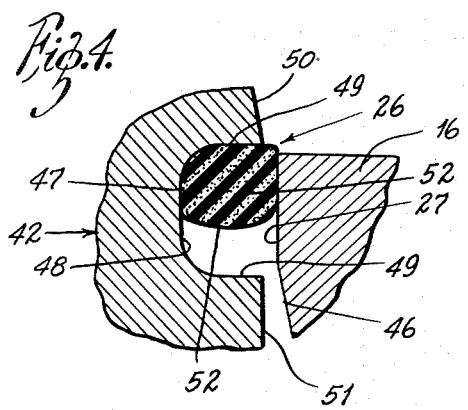
Fig. 4 is a fragmentary enlarged view of the edge of a valve head and the wall of the valve port immediately adjacent thereto, the O-ring being carried by the valve head.

As shown in detail in Fig. 2, the upper portion 27 of the inner wall of the upper valve port 26 is smooth and substantially of constant diameter, and the bottom portion 46 is tapered. The upper valve head 42 contains an annular O-ring groove 48 in its peripheral surface, the groove having an inner wall 47 which is flat, as shown in Fig. 4, and side walls 49 substantially normal to the axis of the valve stem 40. The inner wall 47 and the side walls 49 are joined by smoothly curved surfaces as shown. The upper peripheral portion 50 of the upper valve head 42 is beveled above the O-ring groove 48 at substantially the same angle as the taper of the portion 46, and the remainder 51 is of substantially constant diameter. Disposed in the groove 48 is an O-ring 52 of rubber or like resilient material, which is normally circular in cross section, but which, when disposed against the cylindrical surface 27 of the valve port 26, is squeezed so that it assumes an oval cross section. As shown more particularly in Figs. 4 and 5, the diameter of the material of the O-rings is less than the width of the grooves so that the O-rings can move within the grooves relative to the valve heads.

The lower valve head 44 has a smooth vertical outer peripheral wall 54 which terminates in an upper beveled portion 56.

Figure 5:
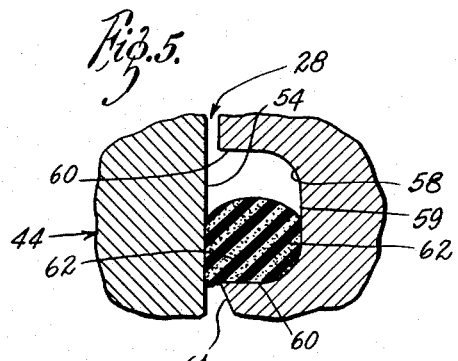
Fig. 5 is a fragmentary enlarged view of the edge of a valve head and the wall of the valve port immediately adjacent thereto, the O-ring being carried by the valve port.

Formed in the inner wall of the lower valve port 28 is an annular O-ring groove 58 which has a flat inner wall 59, and side walls 60 which are substantially normal to the axis of the valve stem 40 (Fig. 5). The inner wall 59 and the side walls 60 are joined together by smoothly curved surfaces. The lower edge portion 61 of the lower valve port 28 is beveled in a manner similar to that of the portion 56 of the lower valve head, for a purpose to appear.

A lower O-ring 62 is disposed in the groove 58. This O-ring is normally of circular cross section, but when it is disposed between the valve head and the valve port, it becomes deformed, as previously described.

As shown particularly in Fig. 2, the valve heads 42 and 44 are considerably smaller in diameter than their respective valve ports 26 and 28. Because of the resiliency of the O-rings and the width of the grooves which permit the rings to compress, it is apparent that the machining tolerances can be much greater than in constructions where there is a metal-to-metal contact. In actual practice, it has been found that there can be as much as a 1/32 inch gap between these parts without adversely affecting the operation of the valve.

The modified construction shown in Fig. 3 includes two valve heads 63 and 263 mounted on a valve stem 240, and two valve ports 64 and 264. The valve heads 63 and 263 are similar in construction, and the valve ports 64 and 264 are also similar in construction, and are similar to the valve head 42 and valve port 26 shown in Fig. 2 previously described. Only one set, as shown in Fig. 3, will be described, the other set having the same construction identified by like numbers having a numeral "2" in front of them.

In the modified construction shown in Fig. 3, the valve port 64 is cylindrical in shape and has a flat vertical inner wall 66 which terminates at the bottom in a beveled portion 68. The valve head 63 contains an annular O-ring groove 70 in its peripheral surface, the groove having a flat inner wall and side walls substantially normal to the axis of the valve stem 240. The lower portion 71 of the valve head 63 is smooth and of constant diameter, and the upper peripheral portion 72 is beveled in a manner similar to the beveled portion 68, for a purpose to appear. Disposed in the groove 70 is an O-ring 74 which is normally of circular cross section, but which, as described previously, is deformed somewhat when it is brought into contact with the flat wall 66, as when the valve is moved to the closed position.

The diaphragm-type motor assembly 14, which will now be described, is the same for both the original valve head and port construction shown in Fig. 2, and the modified construction shown in Fig. 3. It includes a cup-shaped lower diaphragm housing member 76 fastened to the upper end of the valve housing 16 by machine screws 78. The housing member 76 contains an opening 80 which is in alignment with the opening in the upper chamber 20, and which slidably receives the upper end of the valve stem 40. A convex-shaped upper diaphragm housing member 82 is fastened to the lower housing member 76 by machine screws 84, and held between the two housing members is a diaphragm 85 of conventional construction. A port 87 is contained in the housing member 76 to provide a passageway between the upper chamber 20 and the chamber below the diaphragm. The diaphragm 85 contains an opening 86 which receives the upper end of the valve stem 40. A nut 88 and washer 89 are fastened to the valve stem 40 below the diaphragm 85, and disposed on the valve stem above the diaphragm is a rigid cup-shaped member 90 which limits the upward movement of the diaphragm, as will appear. Disposed on the end of the valve stem 40 is a washer 92 and a nut 94 fastening and sealing together the limiting member 90, the diaphragm 85, and the valve stem 40.

The upper diaphragm housing member 82 contains an opening 96 at its center. A cap member 98 is fastened to the upper housing member 82 about the opening 96 by machine screws 100, and a coiled spring 102 is disposed between the cap member 98 and the diaphragm 85 so as to urge the latter downwardly. The upper diaphragm chamber is in communication with the atmosphere by means of a passageway 104 provided in the upper housing member 82.

*Operation of regulators shown in Figs. 1–5*

The operation of the modified construction shown in Fig. 3 will be discussed first because it is the more basic construction.

Assuming that the valve is fully closed, the gas or liquid in the inlet chamber 18 exerts a force upwardly on the lower surface of the upper valve head 63 which is approximately equal and opposite to the force it exerts downwardly on the upper surface of the lower valve head 263. For all practical purposes, these forces will be equal and opposite. Also, the forces resulting from the fluid on the outlet side which act on the upper surface of the upper valve head 63 and the lower surface of the lower valve element 263 are equal and opposite for all practical purposes. Thus, the only forces affecting the position of the valve stem assembly 38 are, on the one hand, the forces of the spring 102 urging downward movement, and, on the other hand, the fluid pressure force of the gas or liquid which acts below the diaphragm 85 urging upward movement.

When the pressure in the outlet conduit 32 drops below normal, the pressure in the upper chamber 20 and in the chamber below the diaphragm 85 will also be below normal so as to permit the spring 102 to move the diaphragm 85 and valve stem assembly 38 downwardly so as to open the valves and cause the pressure to build up again.

When the valve stem 240 and the valve heads 63 and 263 move downwardly relative to the valve ports 66 and 266 so as to move the O-rings 74 and 274 out of contact with the walls of the valve ports, the gas or liquid from the inlet conduit 30 and inlet chamber 18 will flow into the upper and lower chambers 20 and 22, into the chamber below the diaphragm 85, and also into the outlet chamber 24 and outlet conduit 32. Because the beveled portions of the valve heads and valve ports are complementary in shape, an opening will be provided between these members as soon as the O-rings move out of contact with the walls. Furthermore, this opening between the two is proportional to the movement of the valve stem assembly 38. This results in a uniformly increasing opening (and throttling when the movement is in the opposite direction) which cannot be achieved by valve heads and valve elements with straight walls. The force of the gas or liquid acting on the upper and lower surfaces of the valve heads 63 and 263 will continue to be balanced so that practically the only forces affecting the position of the valve stem assembly 38 are those produced by the spring 102 acting against the top of the diaphragm and the pressure of the liquid or gas acting against the lower surface of the diaphragm 85.

When the valve is in the open position and the pressure builds up in the outlet conduit 32 and below the diaphragm 85, the diaphragm 85 and the valve stem assembly 38 will be moved upwardly so as to throttle the flow of fluid through the valve, thereby maintaining a substantially constant or regulated pressure in the outlet conduit 32. As commented on previously, the complementary beveled portions of the valve elements and valve ports result in a uniform throttling of the fluid flow.

The valve stem assembly 38 is guided in its vertical movement by the lower end of the valve stem 240 being slidably disposed in the cavity 36 and the upper end slidably disposed in the opening 80. Also, the beveled portions 72 and 272 at the upper edges of the valve heads, and the beveled portions 68 and 268 at the valve ports, further aid in the centering of the valve stem assembly 38 and the guiding of the O-rings into position as the valve stem assembly 38 moves upwardly toward closing position.

When the valve stem assembly 38 moves toward the closed position, one of the O-rings 74 or 274 may contact the wall of the valve port adjacent thereto before the other one does, this is, of course, assuming that the O-rings are not spaced apart a distance equal to the distance between the valve ports. This will substantially prevent the flow of fluid through this particular valve port and cause the fluid to be directed toward the other valve port and into the outlet chamber 24, and thence to the chamber below the diaphragm 85 to cause further movement of the diaphragm. Even though one valve has seated, the device continues to regulate until the other one seats. This will cause the seated valve head to move further upwardly within its valve port and cause the other valve head to seat, thereby completely closing the valve and stopping the flow of fluid. Thus, it is apparent that with this construction there is no need of close machining tolerances in the axial direction. If the distance between the O-rings and the distance between the valve ports are equal, both O-rings will contact their respective valve ports at exactly the same time, thereby completely sealing off the flow of fluid.

After the valve stem assembly 38 is moved to the fully closed position with each O-ring disposed between its valve head and valve port, the greater inlet pressure in the inlet chamber 18 will act against the lower surface of the upper O-ring 74 and against the upper surface of the lower O-ring 274 so as to move them outwardly in their grooves relative to their respective valve heads. This outward movement of the O-rings causes them to be tightly compressed between the inner walls of the grooves and the walls of the valve ports at the outer sides of the grooves, thereby effectively closing the valve. The O-rings are normally of circular cross section, but when they are compressed between the wall of the valve port and the valve head they are deformed.

Because of the balanced pressures on the upper and lower surfaces of the valve elements, there will be no tendency for the valve stem assembly 38 to override in normal operation. However, if the pressure in the outlet chamber were to build up with the valve fully closed because of some abnormal condition on the outlet side of the system, this would tend to cause the valve stem assembly 38 to move upwardly and open the valve in the wrong direction. This is prevented by the upper edge of the limiting member 90 abutting the upper diaphragm housing member 82.

Although the construction shown in Fig. 3 has an advantage over that shown in Fig. 2 from some standpoints, it is not as satisfactory when there is a large difference between the inlet and the outlet pressures.

Referring to Fig. 3, it will be noted that as the valve stem assembly 38 moves upwardly toward the closed position, the upper edge of the lower valve head 263 will approach the lower edge of the lower valve port 264, and a relatively small first gap will be provided between the beveled portions 272 and 268. Also, a slightly larger second gap will be provided between the lower edge of the beveled portion 268 of the valve port and the upper edge of the smooth portion 271 of the valve head. When the pressure differential between the inlet chamber 18 and the outlet chamber 22 is relatively large, the lower O-ring 274 may be blown off the valve head 263 and through this second gap the instant the O-ring touches the beveled portion 268 of the valve port, and pressure differentials exist in place of velocity differentials, on opposite sides of the O-ring.

This difficulty is obviated in the preferred construction shown in Figs. 1 and 2 by placing the lower O-ring 62 in the groove 58 formed in the wall of the lower valve port 28. In this construction, the O-ring 62 is disposed on the high pressure side of the relatively narrow gap formed between the beveled portion 61 of the valve port 28 and the beveled portion 56 of the lower valve head 44, and is too thick to be blown through this relatively small gap. Thus, so long as both of the O-rings are on the high pressure side of the gaps formed between the valve heads and valve ports, and then members are shaped to provide a gap which is narrower than the O-rings, the latter cannot be blown off.

The preferred construction has an additional advantage when the O-rings are spaced apart a distance which is slightly different than the distance between the valve ports. Thus, if these distances were different, when the valve stem assembly 38 moves toward the closed position, one of the O-rings will seat before the other one. Assuming that the upper O-ring 52 contacts its beveled portion 48 first so as to prevent the flow of fluid into the upper chamber 20, the force of the fluid will be directed against the lower O-ring 62. This will force it downwardly against the bottom wall of its groove 60 and against the beveled portion 56 of the valve head 44 so as to substantially close off the valve. The same result is also obtained if the lower O-ring 62 seats first. In this case, the fluid will be directed upwardly so as to urge the upper O-ring 52 upwardly in its groove toward the beveled portion 46. However, if the valve ports are spaced too far apart for the O-rings to seat in this manner, the escaping fluid will cause the valve stem assembly 38 to continue to move upwardly until both ports are closed, as previously described.

The modified pressure regulator 111 shown in Figs. 6 through 10 will now be described. It operates in substantially the same manner as the one illustrated in Figs. 1 and 2, but is of an improved construction, particularly as to the valve body and the lower valve head and valve port assembly.

The modified regulator 111 is very simple from the standpoint of manufacturing inasmuch as the valve body is formed primarily by drilling and tapping operations. The construction of the valve body is also advantageous in that it simplifies the assembly of the device and permits the valve stem assembly and the lower valve port assembly to be easily and quickly removed for inspection and replacement of parts.

Figures 6, 7:
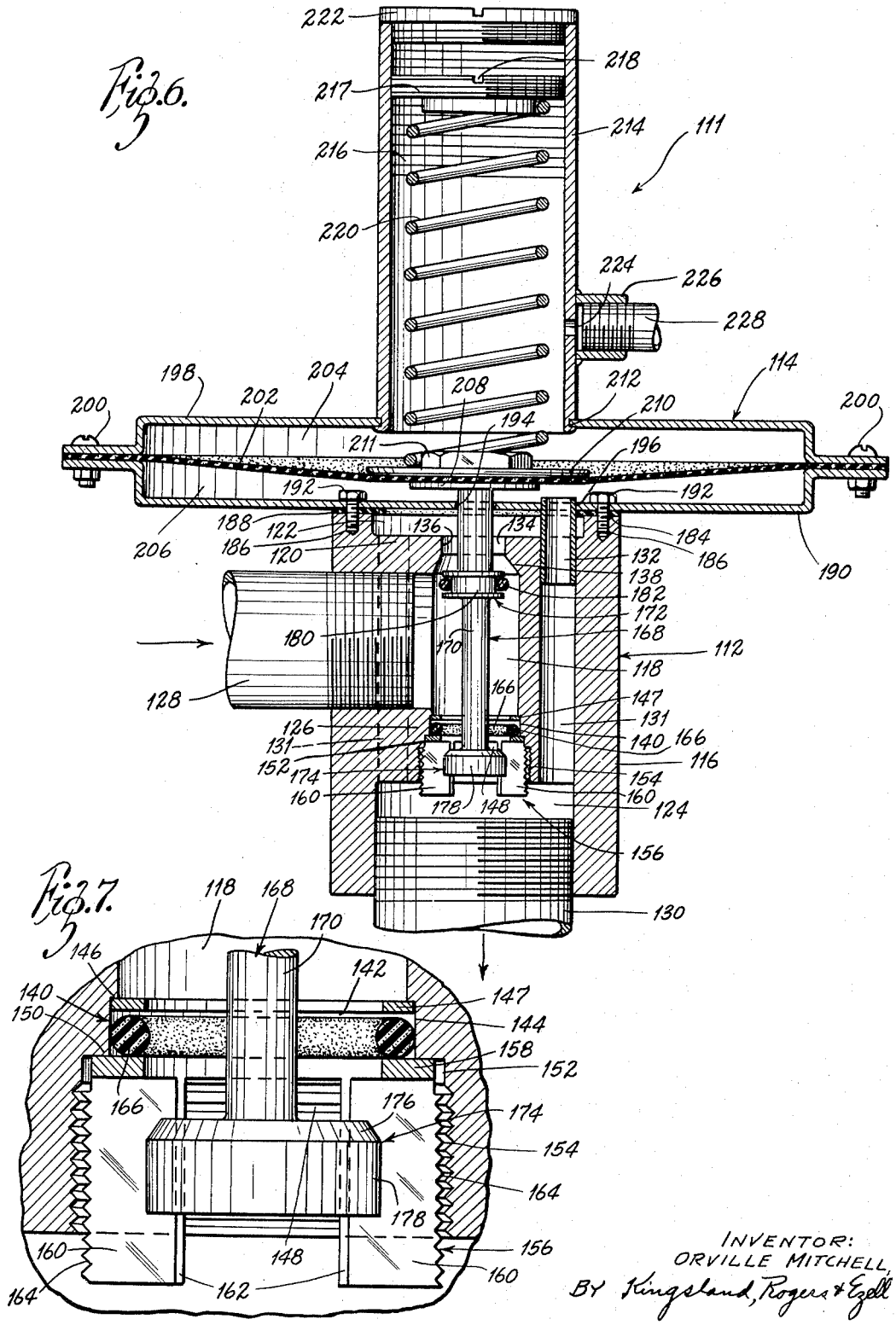
Fig. 6 is a vertical diametrical sectional view of a modified pressure regulator.
Fig. 7 is an enlarged fragmentary vertical sectional view of the lower valve head and port assembly of the modified regulator shown in Fig. 6.

Referring to Fig. 6, the pressure regulator 111 comprises generally a valve assembly 112 and a diaphragm assembly 114.

The valve assembly 112 includes a machined valve body 116 which has an inlet or high pressure chamber 118 separated by an upper partition 120 from an open upper chamber 122, and from an open lower outlet chamber 124 by a lower partition 126.

An inlet conduit 128 is threadedly fastened to the side of the valve body 116 and communicates with the inlet chamber 118, and an outlet conduit 130 is threadedly fastened to the bottom of the valve body 116 and communicates with the outlet chamber 124.

Extending between the upper chamber 122 and the outlet chamber 124 is a series of spaced vertically extending passageways 131 which connect together the two chambers. A tubular member 132 is disposed in the upper end of one of the passageways 131 and extends upwardly beyond the upper chamber 122, for a purpose to appear. It will be noted that the ends of the passageways 131 are within the periphery of the openings into the upper chamber 122 and the outlet chamber 124 so that the passageways can be formed by drilling through the center portion of the valve body from either of these chambers.

Formed in the upper partition 120 is an upper valve port 134 which has a smooth upper portion 136 of constant diameter, and a bottom portion 138 which tapers downwardly and outwardly for guiding the valve stem assembly in its upward movement, as will appear.

A lower valve port 140 is formed in the lower partition 126 and includes two stepped annular recesses. A first or upper recess 142 has a smooth side wall 144 and is of slightly larger diameter than the inlet chamber 118 so as to provide a shoulder 146 therebetween. A washer-like member 147 having an outer diameter slightly smaller than the diameter of the upper recess 142 is positioned therein so as to be limited in its upward movement by the shoulder 146. A second or lower recess 148 is formed immediately below the upper recess 142 and is of a slightly larger diameter so as to provide a shoulder 150 between them. The upper portion 152 of the side wall of the lower recess 148 is smooth, and the lower portion 154 is threaded to receive a combination valve guide and retainer 156 which is shown more particularly in Figs. 8 through 10. The valve guide and retainer 156 includes a ring-like portion 158 at the upper end thereof which has an inner diameter of substantially the same size as the inner diameter of the washer-like member 147, and an outer diameter which is slightly less than the diameter of the upper portion 152 of the lower recess. Extending downwardly from the ring-like portion 158 is a series of spaced sectors 160, each of which has a smooth narrow arcuate inner surface 162 coextensive with the inner surface of the ring-like portion 158, and a threaded outer surface 164. The threads on the outer surfaces are shaped so that the combination valve guide and retainer 156 can be threaded into the lower portion 154 of the lower recess to cause the upper ring-like portion 158 to abut the shoulder 150 (Figs. 6 and 7).

As shown in Fig. 7, the washer-like member 147 and the ring-like portion 158 form an annular groove with the side wall 144, in which is disposed a lower O-ring 166. The O-ring 166 is made of resilient material such as rubber or neoprene, and normally has a circular cross section. The width and depth of the annular groove formed by the washer-like member 147 in the ring-like portion 158 are such that the O-ring can move axially in the groove and the inner portion of the O-ring can extend inwardly slightly beyond the inner edges of the washer-like member 147 and the ring-like portions 158, for a purpose to appear.

The lower O-ring 166 and the members forming the upper and lower surfaces of the groove in which it is disposed can be easily and quickly removed by merely unscrewing the combination valve guide and retainer 156. Also, the diameters of the upper valve port 134, the inlet chamber 118, and the lower valve port 140 increase progressively downwardly so that they can be formed successively by a rotating type of tool inserted from the outlet chamber end of the valve body.

Mounted within the inlet chamber 118 for reciprocal movement relative to the valve ports 134 and 140 is a valve stem assembly 168 (Fig. 6). It includes an elongated valve stem 170 which contains upper and lower valve heads 172 and 174, respectively, which are spaced apart a distance substantially equal to the distance between the valve ports. The lower valve head 174 has a beveled upper portion 176 and a smooth lower portion 178 of constant diameter. The diameter of the lower portion 178 is slightly less than the diametrical distance between the surfaces 162, whereby the latter limit the lateral movement of the lower valve head 174 during its travel to and from the lower O-ring 166. The particular sector construction of the combination valve guide and retainer 156 guides the movement of the lower valve head 174 without obstructing the flow of fluid through the lower valve port 140.

The upper valve head 172 has an outer diameter which is slightly less than the inner diameter of the smooth portion 136 of the upper valve port 134. The upper valve head 172 contains an annular groove 180 in its outer periphery, and disposed therein is an upper O-ring 182 of a resilient material, which is normally of circular cross section. The width and depth of the groove 180 are such that the O-ring 182 has limited axial movement within the groove and extends outwardly a slight distance beyond the outer peripehry of the upper valve head 172.

In actual practice, it has been determined that the radial distance between the valve heads and their respective valve ports can be as great as $\frac{1}{32}$ of an inch without adversely affecting the successful operation of the device.

The pressure responsive motor for actuating the valve stem assembly 168 which, in this illustration, is of the diaphragm type, will now be described.

The valve body 116 includes a flat upper annular peripheral surface 184 which contains a series of spaced tapped openings 186. Disposed on the surface 184 is an annular gasket 188 which contains a series of openings in alignment with the openings 186.

A lower diaphragm housing member 190 is disposed on the gasket 188 and removably fastened to the valve body 116 by means of machine screws 192 which extend into the openings 186. The housing member 190 contains one opening 194 at its center to slidably receive the upper end of the valve stem 170, and another opening 196 to closely receive the upper end of the tubular member 132. Thus, the chamber defined by the lower diaphragm housing member 190 is indirectly in communication with the upper chamber 122 and directly in communication with the outlet chamber 124 through the tubular member 132 and the passageways 131.

An upper diaphragm housing member 198 is removably fastened to the lower member 190 by means of machine bolts 200, and fastened between the two is a diaphragm 202 which divides the housing into an upper diaphragm chamber 204 and a lower diaphragm chamber 206.

The upper end of the valve stem 170 is fastened to the diaphragm 202 by means which include a flat disc 208 disposed below the diaphragm 202, a pressure disc 210 disposed above the disc 208, and a nut 211 removably threaded on the end of the valve stem 170.

The upper housing member 198 contains an opening 212 at its center, and fastened therein is an upwardly extending hollow cylindrical member 214 which is open at both ends. The upper portion of the inner surface of the member 214 contains threads 216, and threadedly disposed therein is an externally threaded plug 217 which has a kerf 218 in its upper surface.

Disposed within the cylindrical member 214 is a coiled spring 220 which extends between the plug 217 and the pressure disc 210 so as to urge the diaphragm 202 downwardly.

The position of the plug 217 within the cylindrical member 214 can be changed to vary the length of the spring 220 and thereby the pressure exerted by it against the pressure disc 210 and the diaphragm 202.

A cover member 222 is threadedly fastened to the top of the cylindrical member 214 to close the end and conceal the adjusting plug 217.

A vent 224 is provided in the wall of the cylindrical member 214, and fastened about the vent on the outside of the member 214 is an internally threaded sleeve 226 which receives one end of a vent pipe 228.

This modified regulator is relatively simple in construction, and the valve body can be formed with a minimum number of machining operations, the majority of which are simple drilling and tapping operations. Furthermore, the device is extremely easy to assembly and disassemble. The lower O-ring 166 and its associated groove assembly can be easily and quickly removed by merely removing the outlet conduit 130 and unscrewing the combination valve guide and retainer 156. Also, the entire valve stem assembly 168 can be easily withdrawn downwardly through the outlet chamber 124 after removing the outlet conduit 130, the upper diaphragm housing 198, and the nut 211 on the end of the valve stem 170.

*Operation of modified regulator of Figs. 6–7*

The operation of the modified regulator construction illustrated in Figs. 6 and 7 is similar to the operation of the construction shown in Figs. 1 and 2, previously described.

When the valve stem assembly 168 is in the downward or open position (Fig. 6), the fluid from the inlet conduit 128 enters the inlet chamber 118, and then passes through the valve ports 134 and 140 to the upper chamber 122 and the outlet chamber 124, respectively. The upper chamber 122 and the outlet chamber 124 are always in communication through the passageways 131 so that the axial pressures on the valve heads 172 and 174 are balanced, as previously described with reference to the operation of the other regulators. Also, the lower diaphragm chamber 206 is directly in communication with the outlet chamber 124 and indirectly in communication with the upper chamber 122 through the tubular member 132 and passageways 131 so that outlet pressure is continuously urging the diaphragm 202 upwardly against the action of the spring 220.

When the outlet pressure exceeds the amount for which the regulator is set, the diaphragm 202 will be urged upwardly so as to move the valve stem assembly 168 upwardly toward the closed position. As the valve stem assembly 168 moves upwardly, the flow of fluid through the valve ports will be throttled so as to reduce the outlet pressure. However, if the outlet pressure continues to increase, the upper O-ring 182 will become wedged against the upper portion 136 of the upper valve port 134, and the lower O-ring 166 will be wedged between the wall 144 and the outer surface 178 of the lower valve head 174, thereby stopping the flow of fluid through the valve ports. As previously described with reference to the operation of the other regulators, the high pressure in the inlet chamber 118 forces the O-rings outwardly so as to wedge them more tightly in place and thereby increase the sealing action.

Thus, it is apparent that there has been provided balanced pressure regulator constructions which fulfill all of the objects and advantages sought therefor.

It is to be understood that the foregoing description and the accompanying drawings have been given only by way of illustration and example, and that changes and alterations in the present disclosure which will be readily apparent to one skilled in the art are contemplated as within the scope of the present invention which is limited only by the claims which follow.

What is claimed is:

1. A balanced pressure responsive valve comprising a housing having an inlet chamber, an outlet chamber, and partition means therebetween having two aligned spaced valve ports, both of which connect the inlet and outlet chambers together; a fluid pressure responsive power means having a fluid pressure operated movable wall; a valve stem connected to the wall to be displaced thereby; a pair of valve elements on the stem axially spaced apart therealong substantially the same distance as the distance between the valve ports to cooperate with the aligned valve ports, one valve element being on the outlet chamber side of its port and the other on the inlet chamber side of its port, whereby the valve elements may substantially simultaneously open and throttle flow from the inlet chamber to the outlet chamber, each valve element being of a size to pass into its said port, the outlet and inlet chambers adjacent the respective ports being substantially larger than the ports to enable the valve elements to have free movement in said chambers, out of contact with the walls of said chambers, each valve element and its port constituting the members of a valve set; an O-ring sealing means for each valve set including an O-ring retaining means on one of the members and a flexible, rubber-like O-ring in the said retaining means, the retaining means providing a channel somewhat wider than the O-ring, so that the O-ring has limited movement in the channel, in the direction of operation of the valve element, the O-ring being inserted into the retaining means by being deformed to pass the rim of the channel, and being retained in the channel by the resilience of the O-ring, the other of said members having a peripheral wall to engage said O-ring, whereby the O-ring may seal with the external wall of the valve and the internal valve seating wall of the port, the movable wall of the power means having an amount of movement to displace the valve elements from their closing positions wherein the O-rings are sealed as aforesaid to an open position in which the valve elements are within the enlarged outlet and inlet chambers, and the O-rings and their associated peripheral walls are out of contact, the O-ring being mounted on the member of each valve set that is toward the inlet side of the housing when the valves are in the open position, thus providing one O-ring upon one valve element and the other O-ring on the partition means.

2. The combination of claim 1, wherein the edge of each valve element facing its port is tapered and the edge of each valve port wall facing the valve element is similarly tapered, the tapered surface on each of the valve set members that supports the O-ring extending substantially to said O-ring, and the remaining diameter of the edge of each valve element being smaller than the valve port to enable the element to enter the valve port.

3. A balanced pressure responsive valve comprising a housing having an inlet chamber, an outlet chamber, and partition means therebetween having two aligned spaced valve ports, both of which connect the inlet and outlet chambers together; a fluid pressure responsive power means having a fluid pressure operated movable wall; a valve stem connected to the wall to be displaced thereby; a pair of valve elements on the stem axially spaced apart therealong substantially the same distance as the distance between the valve ports to cooperate with the aligned valve ports, one valve element being on the outlet chamber side of its port and the other on the inlet chamber side of its port, whereby the valve elements may substantially simultaneously open and throttle flow from the inlet chamber to the outlet chamber, each valve element being of a size to pass into its said port, the outlet and inlet chambers adjacent the respective ports being substantially larger than the ports to enable the valve elements to have free movement in said chambers, out of contact with the walls of said chambers, each valve element and its port constituting the members of a valve set; an O-ring sealing means for each valve set including an O-ring retaining means on one of the members and a flexible, rubber-like O-ring in the said retaining means, the retaining means providing a channel somewhat wider than the O-ring, so that the O-ring has limited movement in the channel, in the direction of operation of the valve element, the O-ring being inserted into the retaining means by being deformed to pass the rim of the channel, and being retained in the channel by the resilience of the O-ring, the other of said members having a peripheral wall to engage said O-ring, whereby the O-ring may seal with the external wall of the valve and the internal valve seating wall of the port, the movable wall of the power means having an amount of movement to displace the valve elements from their closing positions wherein the O-rings are sealed as aforesaid to an open position in which the valve elements are within the enlarged outlet and inlet chambers, and the O-rings and their associated peripheral walls are out of contact, one of the O-rings and its retaining means being on one of the valve elements and the other O-ring and its retaining means being on the other valve port.

References Cited in the file of this patent

UNITED STATES PATENTS

| Number | Name | Date |
|---|---|---|
| Re. 17,022 | Wilson | July 3, 1928 |
| 443,208 | Hultgren | Dec. 23, 1890 |
| 518,000 | Davis | Apr. 10, 1894 |
| 907,771 | Fulton | Dec. 29, 1908 |
| 913,650 | Senter | Feb. 23, 1909 |
| 952,416 | Chase | Mar. 15, 1910 |
| 2,098,014 | Polston | Nov. 2, 1937 |
| 2,360,733 | Smith | Oct. 17, 1944 |
| 2,431,437 | Von Der Werff | Nov. 25, 1947 |
| 2,484,102 | Valley | Oct. 11, 1949 |
| 2,513,976 | Weatherhead | July 4, 1950 |
| 2,524,142 | Seeloff | Oct. 3, 1950 |
| 2,702,049 | Seeloff | Feb. 15, 1955 |

FOREIGN PATENTS

| Number | Country | Year |
|---|---|---|
| 135,013 | Australia | 1949 |
| 532,590 | Germany | 1931 |
| 615,974 | Great Britain | of 1949 |